United States Patent
Sergeev et al.

(10) Patent No.: US 10,108,631 B2
(45) Date of Patent: Oct. 23, 2018

(54) SYSTEM AND METHOD OF REMOVING UNUSED REGIONS OF A DATA FILE

(71) Applicant: Acronis International GmbH, Schaffhausen (CH)

(72) Inventors: Alexei Sergeev, Moscow (RU);
Stanislav Protasov, Moscow (RU);
Mark Shmulevich, Moscow (RU);
Serguei Beloussov, Singapore (SG);
Yuri Per, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 360 days.

(21) Appl. No.: 14/988,923

(22) Filed: Jan. 6, 2016

(65) Prior Publication Data

US 2017/0192997 A1    Jul. 6, 2017

(51) Int. Cl.
*G06F 17/30* (2006.01)
*G06F 3/06* (2006.01)

(52) U.S. Cl.
CPC ........ *G06F 17/30138* (2013.01); *G06F 3/064* (2013.01); *G06F 3/0608* (2013.01); *G06F 3/0652* (2013.01); *G06F 3/0683* (2013.01); *H05K 999/99* (2013.01)

(58) Field of Classification Search
CPC ...... G06F 3/0608; G06F 3/064; G06F 3/0652; G06F 3/0683; G06F 17/30138; G06F 17/30117
USPC ........................................................ 711/166
See application file for complete search history.

(56) References Cited

U.S. PATENT DOCUMENTS

| | | | | |
|---|---|---|---|---|
| 6,023,744 A | * | 2/2000 | Shoroff | G06F 3/0608 707/999.202 |
| 6,230,247 B1 | * | 5/2001 | Cannon | G06F 3/0608 711/170 |
| 8,904,136 B2 | * | 12/2014 | Sobel | G06F 3/0608 711/165 |
| 2010/0287218 A1 | * | 11/2010 | Hu | G11B 27/034 707/822 |
| 2012/0239896 A1 | * | 9/2012 | Sobel | G06F 3/0608 711/165 |
| 2013/0041927 A1 | * | 2/2013 | Song | G06F 3/0608 707/813 |
| 2014/0046912 A1 | * | 2/2014 | Baldwin | G06F 17/30138 707/692 |

(Continued)

*Primary Examiner* — Reginald G Bragdon
*Assistant Examiner* — Aaron D Ho
(74) *Attorney, Agent, or Firm* — Arent Fox LLP; Michael Fainberg

(57) ABSTRACT

A system and method is disclosed for reducing a physical size of a data file that includes a plurality of blocks in sequence with each block having a defined size with a starting position and an end position. According to one aspect, the method includes obtaining information relating to an occupied physical region of the data file, where the occupied physical region contains unused space and/or unused data, and determining positions of first and second boundaries of the occupied physical region of the data file relative to the plurality of blocks in the data file. Furthermore, the method includes equalizing the occupied physical region by adjusting the first and second boundaries of the occupied physical region of the data file and removing data between the start and end of the removal region to reduce the physical size of the data file.

17 Claims, 11 Drawing Sheets

(56) References Cited

U.S. PATENT DOCUMENTS

2014/0201167 A1\* 7/2014 Dar .................. G06F 17/30117
　　　　　　　　　　　　　　　　　　　　　707/692

\* cited by examiner

SYSTEM AND METHOD OF REMOVING UNUSED REGIONS OF A DATA FILE

FIELD OF TECHNOLOGY

The present disclosure generally relates to the field of electronic data storage and management, and, more specifically, to a system and method for using information about occupied locations in electronic memory to remove unused regions of a data file.

BACKGROUND

As the number of applications and services provided over the Internet continues to increase, the amount of electronic content, applications and services used by individuals, enterprises, and the like also continues to rise significantly. As a result, these entities are turning to cloud computing to manage this content and data storage. In general, cloud computing, also known as on-demand computing, is a kind of Internet-based computing in which shared resources and information is provided to computers and other devices on-demand. Cloud computing is a model for enabling ubiquitous, on-demand access to a shared pool of configurable computing resources, where the hardware and/or software used to support the data services is dynamically scalable to meet the needs of the services at any given time.

Cloud computing and storage solutions provide users and enterprises with various capabilities to store and process their data content in third-party data centers. Cloud computing relies on sharing of resources to achieve coherence and economies of scale. A user, enterprise or other customer will typically rent, lease, or otherwise pay for access to resources through the cloud, such that the entity does not have to purchase and maintain the hardware and/or software to provide access to these resources.

Accordingly, the development of cloud computing and the ability to purchase both services and capacity from multiple cloud providers has provided a useful secondary storage system that can be utilized by users and enterprises to store and manage data content. However, because the costs of data storage is directly proportional to the amount of data being stored, there remains a need to provide a more efficient and space-saving technique for storing data content and managing the physical size of such data content, especially with remote data storage services, such as these cloud computing services.

SUMMARY

Thus, the present disclosure provides an effective solution for the foregoing problems by using data blocks to optimize file storage in electronic data storage. According to one aspect, data is obtained that relates to occupied regions having unused data and these regions are removed to save physical space of the memory storing the data. Disclosed are example systems, methods and computer program products for performing the improved data storage and management techniques described herein.

In one aspect, an exemplary method is disclosed for reducing a physical size of a data file that includes a plurality of blocks in sequence with each block having a defined size with a starting position and an end position. According to the exemplary aspect, the method includes obtaining, by a processor, information relating to at least one occupied physical region of the data file, where the at least one occupied physical region contains at least one of unused space and unused data; determining, by the processor, positions of a first boundary and a second boundary of the at least one occupied physical region of the data file relative to the plurality of blocks in the data file; when the position of the first boundary of the at least one occupied physical region is within one of the plurality of blocks in the sequence, defining the starting position of a next block in the sequence relative to the one block as a start of a removal region; when the position of the second boundary of the at least one occupied physical region is within another of the plurality of blocks in the sequence, defining the ending position of a previous block in the sequence relative to the another block as an end of the removal region; and removing, by the processor, data between the start and end of the removal region to reduce the physical size of the data file.

According to another aspect, the method includes defining the start of the removal region as the first boundary of the at least one occupied physical region if the first boundary is aligned with a starting position of one of the plurality of blocks in the sequence. According to another aspect, the method includes defining the end of the removal region as the second boundary of the at least one occupied physical region if the second boundary is aligned with an ending position of another of the plurality of blocks in the sequence.

According to another aspect, the method includes estimating, by the processor, a physical size of the removal region between the start and end of the removal region; comparing, by the processor, the physical size of the removal region with a predetermined threshold; and removing, by the processor, the data between the start and end of the removal region to reduce the physical size of the data file only if the physical size of the removal region exceeds the predetermined threshold.

According to another aspect, the predetermined threshold is at least one of a percentage of an overall size of the data file and a defined amount of data.

According to another aspect, the method includes postulating, by the processor, a size relating to the at least one occupied physical region of the data file if the processor cannot obtain the information relating to the at least one occupied physical region of the data file; and determining, by the processor, the positions of the first boundary and the second boundary of the at least one occupied physical region of the data file based on the postulated size relating to the at least one occupied physical region of the data file.

According to another aspect, the method includes obtaining, by the processor, information relating to previous sparsing operations of the data file; and determining, by the processor, the positions of the first boundary and the second boundary of the at least one occupied physical region of the data file that exclude regions previously removed by the previous sparsing operations.

According to another aspect, a system is disclosed for reducing a physical size of a data file that includes a plurality of blocks in sequence with each block having a defined size with a starting position and an end position. According to the exemplary aspect, the system includes an electronic memory configured to store the data file; and a processor configured to obtain information relating to at least one occupied physical region of the data file in the electronic memory, where the at least one occupied physical region contains at least one of unused space and unused data, determine positions of a first boundary and a second boundary of the at least one occupied physical region of the data file relative to the plurality of blocks in the data file, when the position of the first boundary of the at least one occupied physical region is within one of the plurality of blocks in the sequence, define the starting position of a next block in the sequence relative to the one block as a start of a removal region, when the position of the second boundary of the at least one occupied physical region is within another of the plurality of blocks in the sequence, define the ending position of a previous block in the sequence relative to the another block as an end of the removal region; and remove data between the start and end of the removal region to reduce the physical size of the data file in the electronic memory.

According to another aspect, a non-transitory computer readable medium storing computer executable instructions is disclosed for reducing a physical size of a data file that includes a plurality of blocks in sequence with each block having a defined size with a starting position and an end position. According to one aspect, the instructions included are provided for obtaining information relating to at least one occupied physical region of the data file, where the at least one occupied physical region contains at least one of unused space and unused data; determining positions of a first boundary and a second boundary of the at least one occupied physical region of the data file relative to the plurality of blocks in the data file; when the position of the first boundary of the at least one occupied physical region is within one of the plurality of blocks in the sequence, defining the starting position of a next block in the sequence relative to the one block as a start of a removal region; when the position of the second boundary of the at least one occupied physical region is within another of the plurality of blocks in the sequence, defining the ending position of a previous block in the sequence relative to the another block as an end of the removal region; and removing data between the start and end of the removal region to reduce the physical size of the data file.

The above-simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
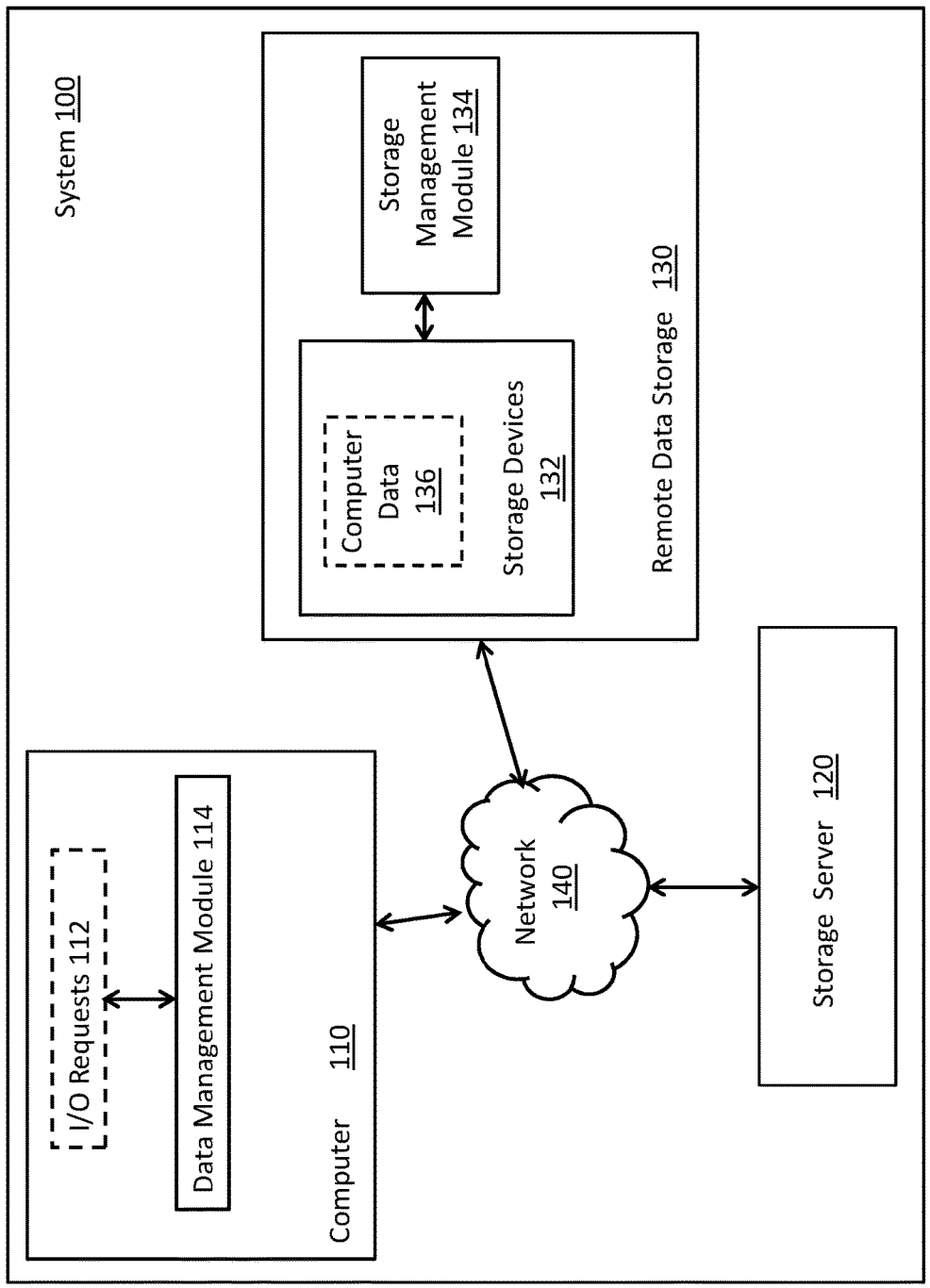
FIG. 1 illustrates a block diagram of a system for optimizing file storage and management according to an exemplary aspect.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

As described herein, a method and system is disclosed for managing aspects of data storage on a file storage system, such as an online/remote file storage service or cloud computing service. Examples of such services include Amazon® Simple Storage Service ("S3"), and Microsoft® Azure ("Azure"). As will be appreciated herein, the method and system provides an efficient mechanism for creating and managing data files, which can allow individuals and organizations to limit, at least to some extent, the increase of data storage costs. According to exemplary aspects, the method and system disclosed herein can be implemented for any system capable of performing sparsing operations for the storing of data as blocks. For example, the method and system can be implemented on existing file systems, such as the New Technology File System by Microsoft®, Paragon ExtFS for Windows®, and the like, where clusters are the desired blocks. Moreover, as noted above, the method and system can be implemented on object storages, such as Azure, S3 and the like, as well as cloud storage services, such as Acronis Cloud Storage, and the like.

In general, companies such as Microsoft® and Amazon® set up networks and infrastructure to provide one or more multi-client services (such as various types of cloud-based storage) that are accessible via the Internet and/or other networks to a distributed set of clients in a company, organization or the like. These data storage companies will herein be referred to as storage service providers. Moreover, the infrastructure provided for multi-client services is designed to implement application and/or data virtualization such that different client devices are provided isolated views of the services (i.e., the data files and the like), so that one client accessing the service or service functionality will not be aware that the same set of resources is also being accessed by another client. These storage service providers can include numerous data centers that can be distributed across many geographical locations and that host various resource pools, such as collections of physical and/or virtualized storage devices, computer servers, networking equipment and the like, needed to implement, configure and distribute the infrastructure and services offered by the storage service provider.

In view of the existing infrastructure described above, FIG. 1 illustrates a block diagram of a system 100 for optimizing file storage and management according to an exemplary aspect. As will be described in detail below, the system and method disclosed herein uses data blocks to optimize file storage for computer data in disk file systems and distributed file systems.

As generally shown, the system 100 includes a computer 110, a server 120, remote data storage 130, and network 140. It is contemplated that the server 120 and remote data storage 130 collectively form a storage service provider, which can be an online/remote file storage service, such S3 or Azure as described above. The remote data storage 130 can generally include hardware and software components configured to manage various storage resources within the computing environment. For example, the remote data storage 130 can include one or more data storage devices 132 (e.g., hard disk drives, optical drives, magnetic tape drives and/or the like) and storage management software (e.g., storage management module 134) that provides an interface to the one or more data storage devices 132. The remote data storage 130 facilitates temporary and/or permanent storage of computer data, such as computer data 136. The computer data may be any type of electronic, digital data generated and/or stored by a computer. For example, the computer data 136 can represent text data, executable program code, audio, video or image data, or any other type of digital data.

The specific algorithms for storing the computer data 136 will be described in detail below, but generally compose files that are each stored as a collection of separately named blocks. Furthermore, the server 120 can be any type of computing device as known to those skilled in the art that is capable of cooperating with the remote data storage 130 to execute file system operations on the computer data 136. It should be appreciated that while server 120 and remote data storage 130 are described as forming an online/remote file storage service (e.g., a cloud computing service), these components can be incorporated into a local area network or the like as should be appreciated to those skilled in the art.

As further shown, the computer 110 is capable of communicating with the storage service provider via network 140. According to the exemplary aspect, the computer 110 may be any type of computing device, such as a laptop, a desktop, a Personal Digital Assistant (PDA), a tablet, a mobile phone and the like. The specific details of the exemplary computer 110 will be described below with respect to FIG. 8. However, as generally shown in FIG. 1, the computer 110 includes input/output requests 112 as well as multiple software applications, including data management module 114.

According to one aspect, the data management module 114 includes software code (e.g., processor executable instructions) in memory, which may be configured to execute/facilitate the input/output requests 112 into a plurality of file system operations that optimize file storage for computer data. For example, the computer 110 can include a computer-processing unit ("CPU") for executing the data management module 114 to determine one or more file system operations that create and manage computer files of computer data according to an exemplary aspect. It should be appreciated that while the exemplary aspect of FIG. 1 illustrates that computer 110 includes the data management module 114 to create and manage data files as described herein, it is contemplated that data management module 114 can be implemented on server 120 according to an alternative aspect. In addition, while the exemplary algorithm disclosed herein are described as being executed primary by the data management module 114, it is noted that these functions can also be performed by the storage management module 134 located at the remote data storage 130 and/or in performed by a combination of the data management module 114 and the storage management module 134.

Optionally, the computer 110 can be delegated with the tasks of a file server that facilitates access and management to the computer data 136. For example, the computer data 136 can be organized as a distributed file system. Accordingly, the data management module 114 can generate one or more log directory records for execution on the computer data 136 and storage on disk, i.e., within the remote data storage 130 as discussed in more detail with respect to FIG. 2B. Alternatively, the server 120 can cooperate with the computer 110 to perform various storage operations that write the one or more log directory records on the remote data storage 130.

Furthermore, network 140 can be any network for communicating data and data operations and can include a communication system (not shown) that connects the various computers of the system by wire, cable, fiber optic, and/or wireless links facilitated by various types of well-known network elements, such as hubs, switches, routers, and the like. Network 140 may employ various well-known protocols to communicate information amongst the network resources. In one aspect, the network 140 can be part of the Internet or intranet using various communications infrastructure such as Ethernet, WiFi and the like.

Referring back to the computer 110, the input/output requests 112 can include information regarding one or more system calls, including file management functions such as create file, open file, close file, parse file, rename file, delete file, read data, write data and/or the like) associated with the computer data 136. According to one aspect, the one or more system calls may form a transaction. As such, the input/output requests 112 can include transactional and non-transactional storage and/or file system operations. Moreover, the input/output requests 112 can be a log file that is periodically copied (i.e., flush time) to the remote data storage 130 for the computer data 136. For example, the input/output requests 112 can be flushed from RAM to a hard disk (e.g., within the remote data storage 130).

Performance of each system call on the computer data 136 requires one or more storage space optimization to be decided and completed. According to the exemplary aspect, the data management module 114 is configured to perform one or more file system operations that optimize storage space based on the I/O requests 112. Execution of the file system operations on the computer data 136 updates the data and/or related metadata as will be described in more detail below.

As described above, the computer 110 includes a plurality of input/output requests 112 that facilitate a plurality of file system operations to optimize file storage for computer data. According to the exemplary aspect, these operations can include the creating and modifying of computer files that each include a plurality of blocks, the mapping of file names into the electronic storage (e.g., remote data storage 130), the selection of the location for the storage of the file blocks in the electronic storage, the removal of a file, the parsing of a file, the renaming of a file, and the locking of a file. Each of these operations is premised on the file structure according to the exemplary aspect in which each data file is composed of a plurality of discrete blocks the advantages of which will be readily apparent based on the description provided below. Each of these operations can be performed by the data management module 114 in computer 100, as generally described above.

Figure 2A:
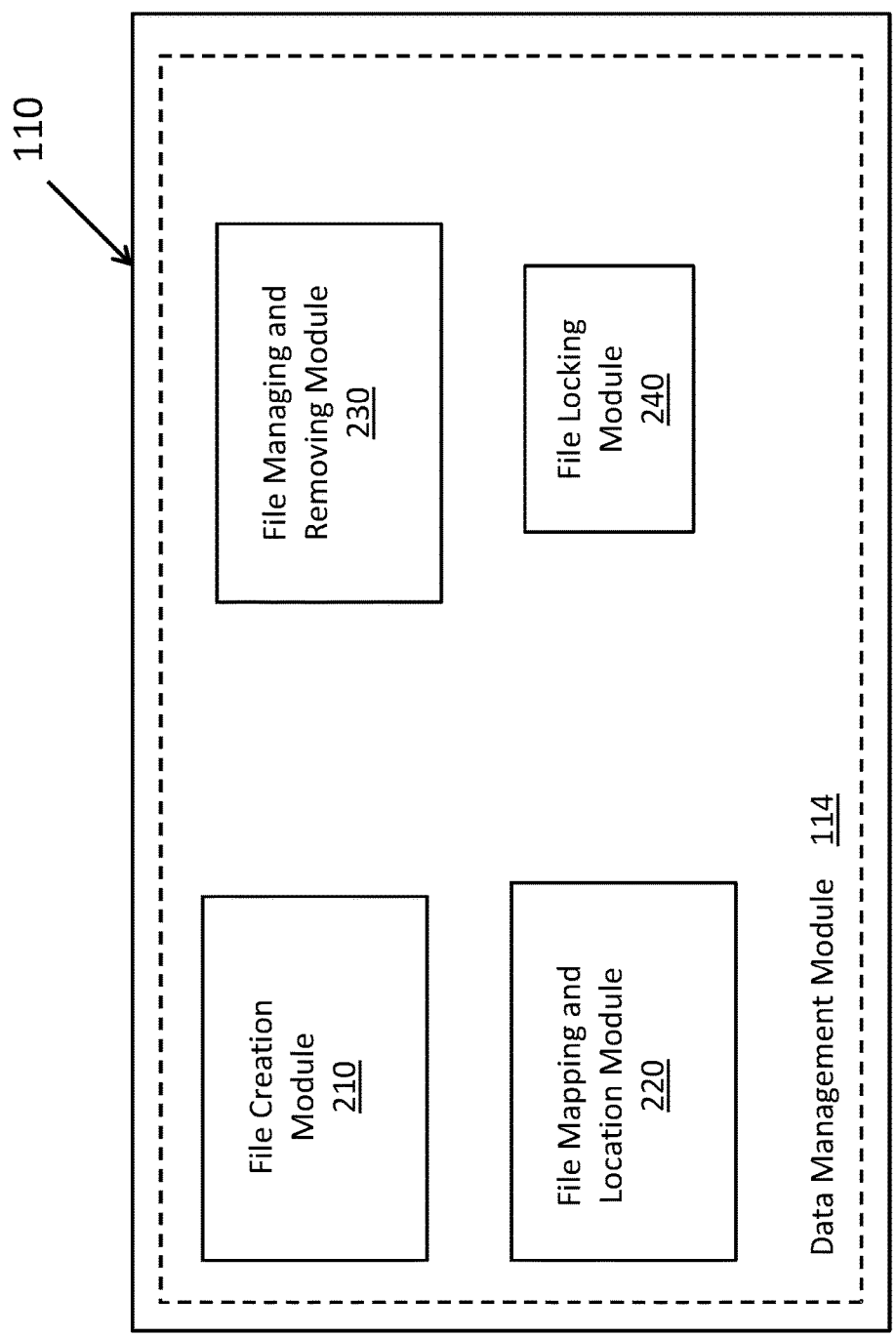
FIG. 2A illustrates a block diagram of a client computer for optimizing file storage and management according to an exemplary aspect.

FIG. 2A illustrates a block diagram of a client computer for optimizing file storage and management according to an exemplary aspect. In particular, the client computer shown in FIG. 2A illustrates a more detailed view of the client computer 110 of system 100 described above with respect to FIG. 1.

As noted above, the client computer 110 includes a data management module 114 that is configured to perform one or more file system operations that optimize storage space based on the I/O requests 112. According to the exemplary aspect shown in FIG. 2A, the data management module 114 can be composed of a plurality of modules. As used herein, the term "module" refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

As shown in FIG. 2A, the data management module 114 can include file creation module 210, file mapping and location module 220, file managing and removing module 230, and file locking module 240. The operations or algorithms performed for each of these modules will be described in detail below. However, according to the exemplary aspect, the file creation module 210 is configured to perform the functions of creating one or more file of the computer data 136 and transmitting the file to electronic memory for storage, such as remote data storage 130. Furthermore, file mapping and location module 220 is configured to generate and transmit instructions to the electronic storage and/or storage service providers, with the instructions specifying the mapping and location of the file(s) in the electronic storage (e.g., the one or more data storage devices 132). In addition, file managing and removing module 230 is configured to send instructions to the electronic storage and/or storage service providers to parse the file and/or delete files accordingly. Finally, file locking module 240 is provided to block certain actions requested by one or more client computers to be performed on a file. The specific I/O requests that require the lock operation will be described in more detail below, but generally, the lock operation prevents certain access to the file, such as reading and/or writing to the file.

Figure 2B:
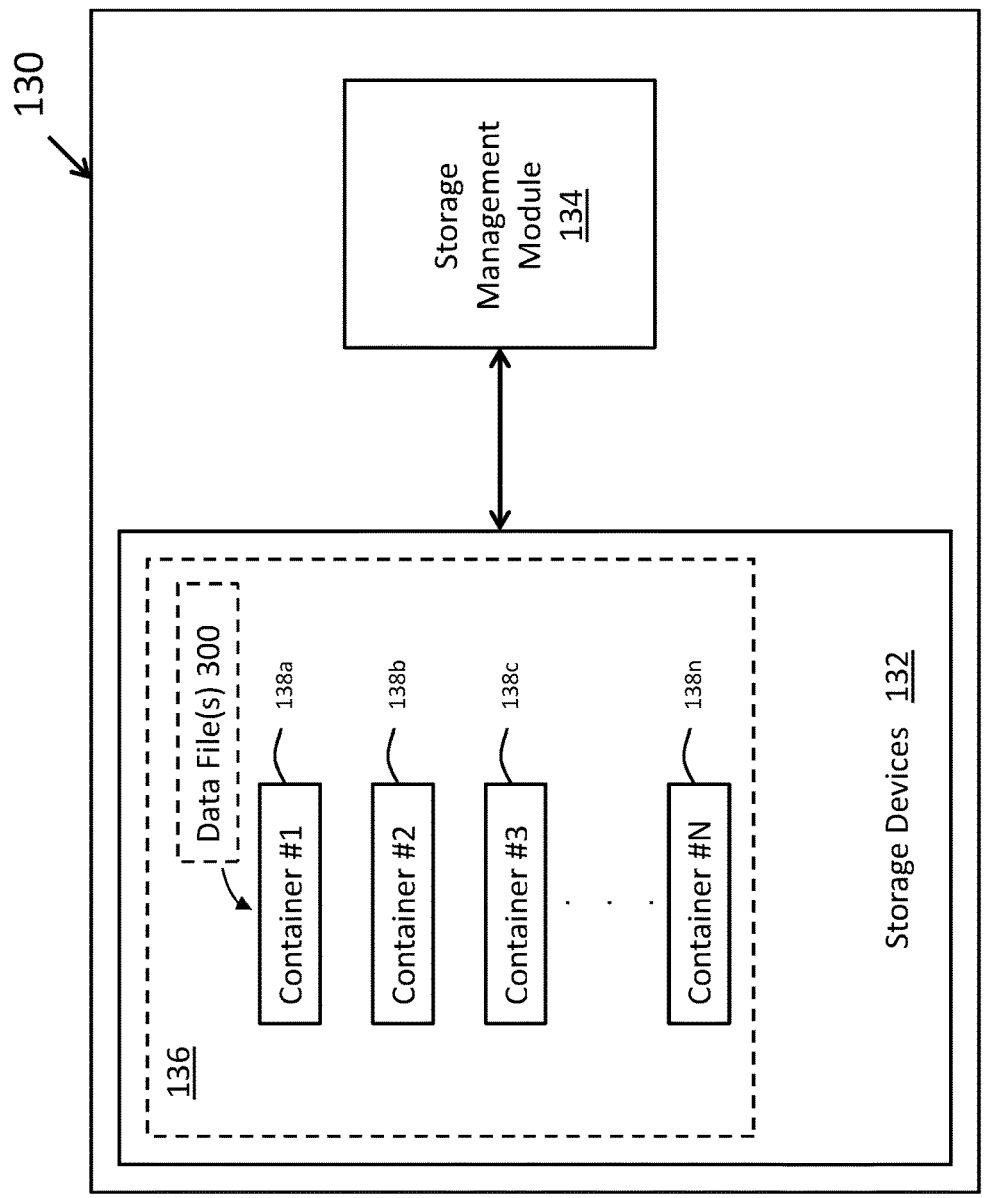
FIG. 2B illustrates a block diagram of a remote data storage system for optimizing file storage and management according to an exemplary aspect.

FIG. 2B illustrates a block diagram of a remote data storage system for optimizing file storage and management according to an exemplary aspect. In general, remote storage providers, such as S3 and Azure, provide "containers" or "buckets" to store data objects from a remote client computer or the like. Thus, as shown above in FIG. 2B, remote data storage 130, which can include a plurality of storage devices 132 as described above, can further include a number of containers 138a, 138b, 138c . . . 138n (alternatively, "buckets") to store computer data 136, such as data files 300. In general, a container can function as the root of an object namespace that is associated with a client computer using the remote storage service. Typically, storage service providers, such as Azure and S3, do not allow embedded containers to be created, but these providers do offer a mechanism of file mapping that imitates the traditional hierarchical structure of embedded directories and files. Thus, the containers can be considered to be analogous to a file system directory or folder. As further shown and described above, the remote data storage 130 can further include storage management module 134 that is capable of receiving instruction from the client computer 110 to store file(s) 300 as well as performing additional operations, such renaming, parsing, removing, locking and other operations and described herein.

Figure 3:
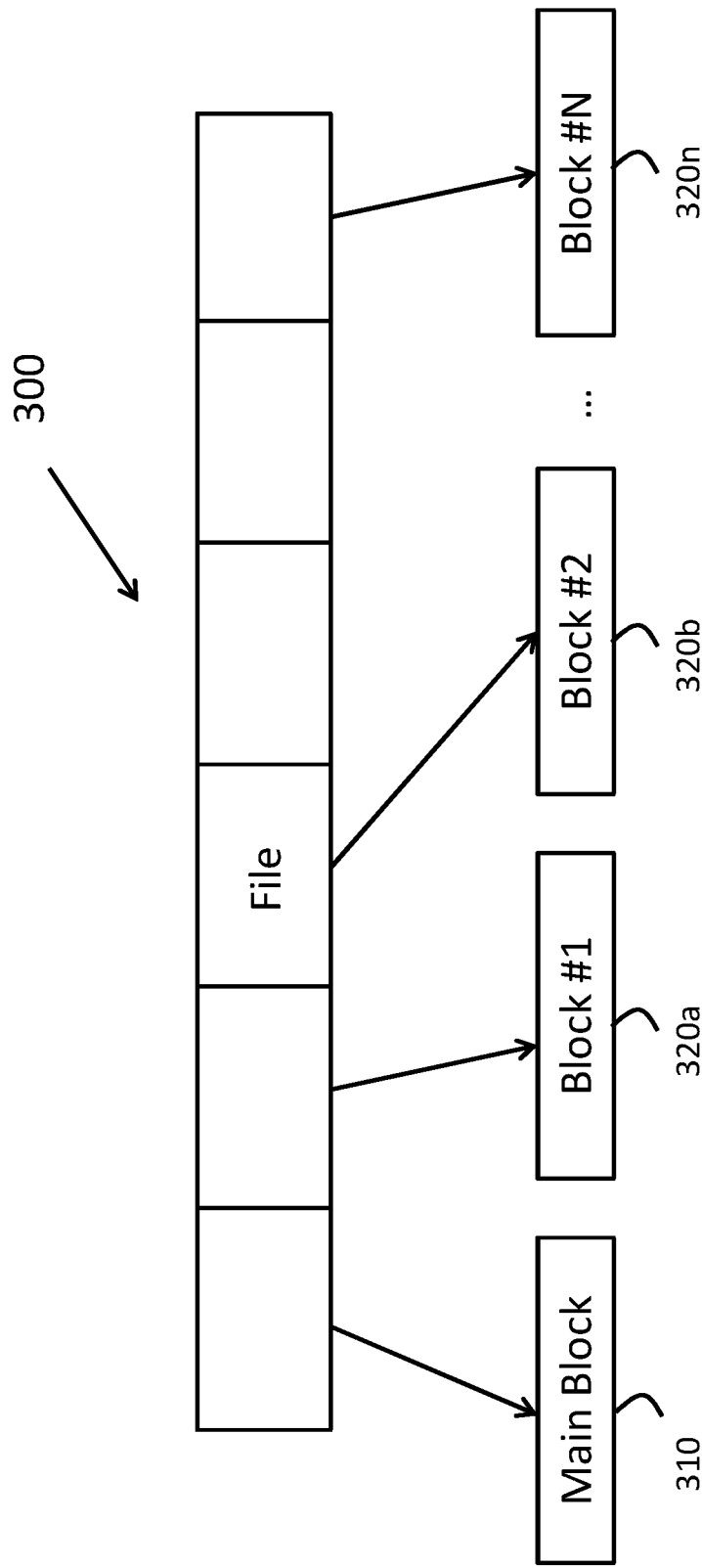
FIG. 3 illustrates a representative file created according to an exemplary aspect of the system and method described herein.

FIG. 3 illustrates a representative file 300 created according to an exemplary aspect of the system and method described herein. As shown, the contents of the file 300 can be created and/or saved in the form of a collection of separate blocks. More particularly, the file 300 can include a main block 310 and a number of subsequent blocks 320a, 320b . . . 320n. When the data management module 114 creates the file 300, each of the blocks can be separately named with the first (main) block 310 being the file name in the file system and the subsequent blocks containing in their name a coded offset relative to the start of the file 300. Moreover, according to an exemplary aspect, each of the blocks except the last block (i.e., blocks 320a to 320n-1) is saved with each block having a fixed size, and, more preferably, each block having the same fixed size. When the data management module 114, and, more particularly, the file creation module 210, is writing data to the end of the file 300 (as an append, for example), the last block (i.e., block 320n) is placed in a buffer, appended, and loaded back into the electronic storage (e.g., remote data storage 130) as part of the file 300. If the writing of data to the last block 320n results (or would result) in a block size that exceeds the fixed size of the block, then data is written to the entire block (i.e., block 320n) and a new block 320n+1 is created for the additional data that would otherwise exceed the fixed block size of block 320n. Further, the block size for each block or for a given region of the file 300 (e.g., a plurality of blocks) is saved as metadata in the main block 310. Thus, the main block 310 contains the metadata for the group of these sizes with an indication of the current file regions.

According to one refinement of the exemplary aspect, both the logical size and physical size of the file 300 are saved in the metadata of the main block 310 and can be refreshed upon writing to the main block 310 (if there are no other blocks) or by a flush operation. However, in certain circumstances, blocks may be larger than the boundary of the logical file size upon interruption of the writing process, for example, if the data has been written to the file, but not followed by a flush operation. In this instance, the content beyond the file boundary will not be accessible in a subsequent reading since such a request will typically indicate the name of the block or object key and the range of data. Moreover, the size of the requested range is dictated by the logical size of the file, and not the actual size of the block. To address this inconsistency, the disclosed system and method provides a corrective measure during the next opening of the file by using a lock operation, which will be discussed in greater detail below. In general, the data management module 114 can perform lock operation by placing a lock on the file 300 before writing data to the file 300 and then, upon opening the file 300 once again when the timeout of the lock is detected the unfinished blocks can be removed or, on the other hand, the file size can be updated.

According to a further aspect described herein, the data management module 114 is configured to perform a sparse operation to remove blocks of the file 300 that fall entirely within a sparse region, i.e., unused space or data that does not contain real computer data necessary to perform current data operations (e.g., read requests) of the file. According to certain aspects, examples of unused space include removed backups or item (file) versions from an archive or the like. These backups/versions and the respective data are unclaimed later and not referenced or used during a file operation. As a result, the archive file regions containing such item(s), data and metadata can be removed to save physical space. Thus, according to an exemplary aspect, a sparse algorithm is a very efficient mechanism for removing regions that may be placed in a middle of an archive file.

If a portion of such a removed block is required upon reading data from the file 300, the data management module 114 is configured to write zeroes into the corresponding portion of the buffer. Furthermore, if the sparse region includes a block with zero offset (i.e., the main block 310 containing the file name and other metadata), then this block is not removed, but replaced by a new block, containing the same metadata, but data of zero size. Advantageously, the system and method reduces the total volume (i.e., the physical size) of the data to be stored, but logically provides a file of the same size as before removal of the unused block.

Figure 4:
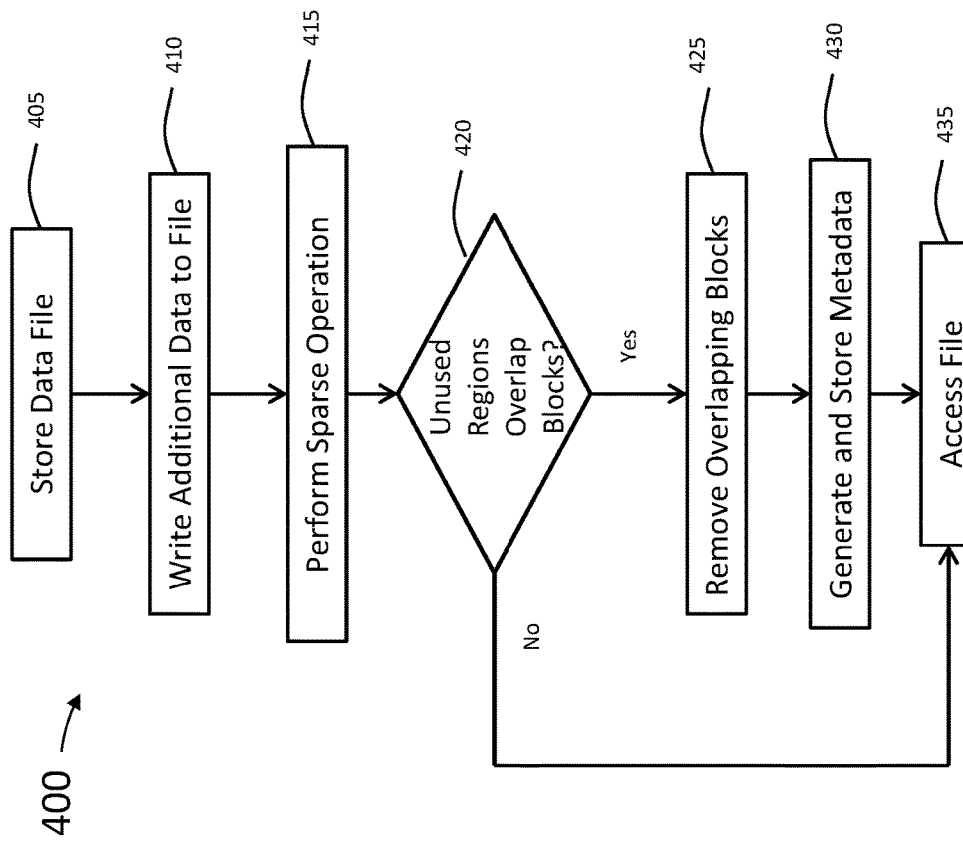
FIG. 4 illustrates a flowchart for a method of writing and reading a computer file according to an exemplary aspect.

FIG. 4 illustrates a method 400 of writing and reading a computer file according to an exemplary aspect. The method or algorithm shown in FIG. 4 can be executed by the data management module 114, and, more particularly, by the file creation module 210 according to an exemplary aspect. Initially, as shown as Step 405, a file (e.g., file 300 of FIG. 3) is stored in electronic memory (e.g., remote data storage 130) that contains a main block and a plurality of subsequent blocks. As described above, the creation of the electronic file 300 can be performed as an I/O request 112 by the data management module 114 of the computer 110 shown in FIG. 1. Next, at Step 410, the data management module 114 can write additional data to file 300 after it has been created. As described above, data is written to the last block (i.e., block 320n) of the file 300, which is placed in a buffer, appended, and loaded back into the electronic storage (e.g., remote data storage 130) as part of the file 300. It should be appreciated that Step 410 of writing additional data to file 300 is an optional step that is not required for the primary aspect of writing and reading files containing a plurality of blocks as described herein.

As further shown, at Step 415, a sparse operation is performed to determine those portions of the data in the file 300 that are no longer used, i.e., that do not contain actual data. Detailed exemplary aspects of the sparing operations will be described in detail below with respect to FIGS. 5 and 6, but, in general, sparse operations involve an algorithm to analyze the file 300 to determine portions of the file that contain "unused" regions. If it is determined that the file 300 contains such unused space, the system then determines at Step 420 whether the unused regions overlap entire blocks of file 300. If the file 300 does not contain any blocks that are overlapped by unused regions, the file creation and storage is complete and the method proceeds to Step 435 as discussed below in which the file 300 can be created. Alternatively, the algorithm shown in FIG. 4 could return to Step 410 where additional data is written to file 300. This return loop is not shown in the aspect shown in FIG. 4. However, in this instance, the algorithm will again perform the sparse operation at Step 415 since the unused regions of file 300 can change as data is continuously appended to the file during Step 410.

If so, the method proceeds to Step 425 where blocks that completely contain only unused space are removed from the file 300. In this instance, metadata is created indicating the location of the block relative to the main block 310 (i.e., the offset described above) of which the metadata can be stored therein (Step 430). Finally, the file can be accessed and read by computer 110 at Step 435. In particular, when the file is read, the metadata contained in main block 310 indicates the position of the sparse block that has been removed from file 300. When the file 300 is read, the data management module 114 creates a virtual block filled with zeros to represent the prior unused block that has been removed. As one skilled in the art will appreciate, such remove of unused or sparse blocks frees up additional space in the electronic memory (e.g., remote data storage 130). According to an alternative aspect, the method can consider inexistent blocks as sparsed. In other words, any block that is inexistent is considered to be sparsed, irrespective of the reason to the absence of such block. In this instance, the main block 310 does not need to store metadata relating to the position of the sparse block that has been removed from file 300. Moreover, in circumstances of append-only data files (e.g., data archives), this aspect would optimize performance and efficiency of the described method.

According to one aspect, the data management module 114 is further configured to perform the instructions for storing the computer data 136 as files 300 in remote data storage 130, and, more particularly, to assign URLs to each block in the storage. According to one aspect, these functions are executed by the file mapping and location module 220. According to this aspect, the URL serves as codes for the address of storage where the blocks are located and the name of the container (or bucket). For example, according to the exemplary aspect, a special character is indicated in the name of the object, which is interpreted as a separator of the path to the file 300 in the container. Then, in the request to the file in the remote data storage 130, the data management module 114 can ask for a listing of the names of only those objects that begin with a certain prefix, but do not contain a separator after this prefix.

According to one exemplary aspect, the data management module 114 can instruct the file to be saved in the container of the remote data storage 130 using the forward slash "/" as the separator. Thus, for example, when the data management module 114 requests a listing of objects with the prefix "dir1/dir2/" and the separator is "/", the remote data storage 130 will return the results containing the names "dir1/dir2/file1", "dir1/dir2/fileN", and "dir1/dir2/dir3/". However, the remote data storage 130 will not return the names "dir1/other_dir/some_file" or "dir1/dir2/dir3/too_deep_file" as these files do not fit the requested criteria.

Advantageously, such a support by the remote data storage 130 makes it possible to provide a traditional hierarchical structure in a file API. The name of the first directory (e.g., "dir1") is the name of the container or bucket at the remote data storage 130. The other directories are virtual entities. If a client such as computer 110 requires the creation of a file with a long hierarchical path, the main block (e.g., block 310) will be created with the indicated name, but the creation of all higher virtual directories is done automatically. According to one aspect, when all files containing a directory are with an identical prefix are removed, the directory itself disappears.

According to one aspect, then a user of the client computer (e.g., computer 110 of FIG. 1) creates a file through the file API, the data management module 114 causes an unused object with the name of the directory to be created at the remote data storage 130. The user, upon listing the content of the parent directory created, will see his newly created directory, which would be the same view that would occur in the case of a traditional file storage system.

Although the main file block (e.g., block 310) of the created file 300 has the name indicated by the client upon creating the file 300, the subsequent blocks 320a, 320b . . . 320n of the file 300 should not be visible to the user accessing the container, unless the user is an administrator, for example. Since the number of blocks in a file may be very large, the blocks need to be stored along a path, such that the names of the blocks do not appear in the result of a listing of files during a request from the storage server, such as server 120. The system and method disclosed herein contemplates two ways to store the subsequent blocks 320a, 320b . . . 320n of a file 300, such that they are not visible to a user.

According to a first aspect, the server 120 causes the file blocks 320a, 320b . . . 320n to be stored in a separate container (or bucket) in the remote data storage 130 with a randomly generated identification (i.e., a GUID). For example, the main block 310 can be stored in container 138a while the secondary blocks, 320a, 302b, etc., can be stored in one or more of containers 138b, 138c . . . 138n, as shown in FIG. 2B. Furthermore, the GUID can be written into the metadata of the main block 310 of the file 300. In one aspect, the containers themselves can contain metadata related to the objects and files stored therein. Thus, according to this aspect, the metadata in the container can be indicated with the attribute hidden=1, which results in this directory being prevented from appearing when a user (not an administrator) is navigating along a tree of clients to view different files.

Alternatively, according to another aspect, the server 120 can cause the file blocks 320a, 320b . . . 320n to be stored in a virtual directory having a path to this directory being stored as metadata in the main block 310 of the file 300. Thus, when a user is navigating along a tree of clients to view different files, such service directories with the blocks of files 320a, 320b . . . 320n do not appear to the user. According to this aspect, the virtual directories can be placed in the same container as the main block 310 or a different container than main block 310. An example name for a file can be "subaccount_root/some_dir/_some_file". Thus, the blocks can have names such as "subaccount_root/reserved_name_for_file_chunks/guid 1/10000"; "subaccount_root/reserved_name_for_file_chunks/guid 1/2000" and so on.

As discussed above with respect to FIG. 1, one of the I/O requests 112 generated by the client computer 110 and carried out by the data management module 114 is the request to remove unused regions of a file 300 from the remote data storage 130.

Figure 5A:
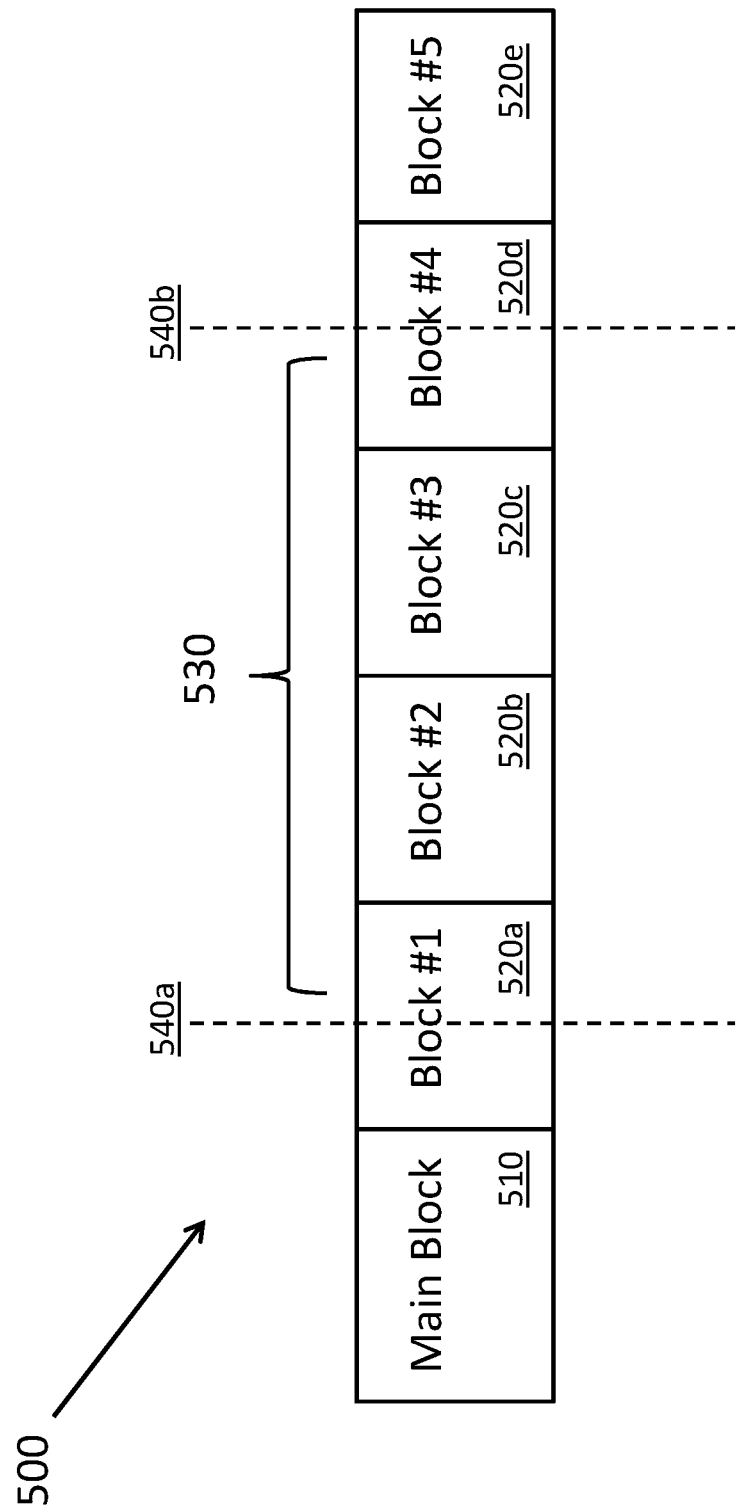
FIGS. 5A and 5B illustrate a file created and subject to a sparsing operation according to an exemplary aspect.
Figure 5B:
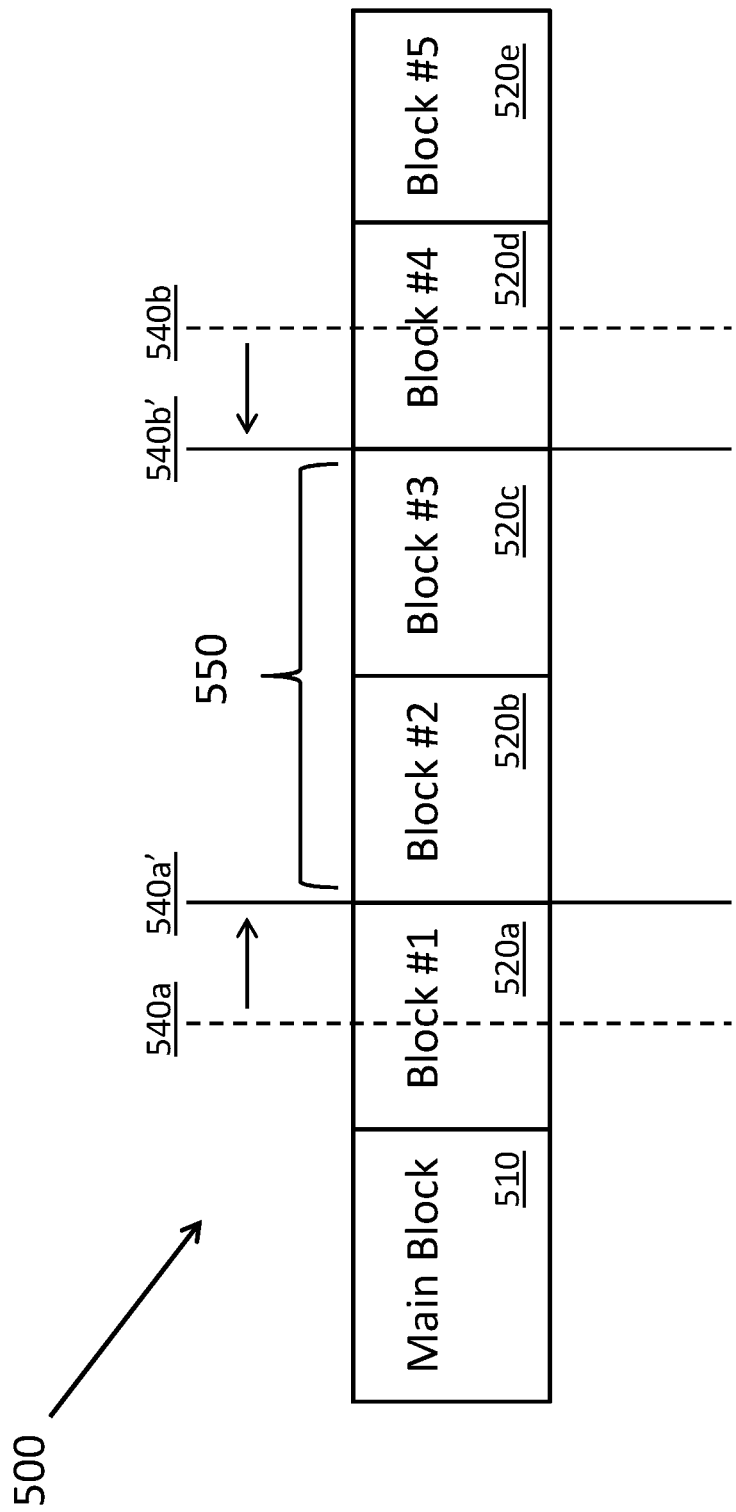

FIGS. 5A and 5B illustrate a file 500 created and subject to a sparsing operation according to an exemplary aspect. Generally, the file 500 shown in these figures has a similar format as file 300 described above with respect to FIG. 3. In this instance, file 500 includes a main block 510 and five secondary blocks 520a, 520b, 520c, 520d and 520e. It should be appreciated that although five secondary blocks are shown in this example, the file 500 can contain fewer blocks or a very large number of secondary blocks as described above.

Similar to file 300 described above, when the data management module 114 creates the file 500, each of the blocks can be separately named with the first (main) block 510 being the file name in the file system and the subsequent, secondary blocks containing in their name a coded offset relative to the start of the file 500. Moreover, according to an exemplary aspect, each of the blocks (except possibly the last block 520e) is saved having a fixed size, and, more preferably, each block 520a-520d has the same fixed size. The block size for each block or for a given region of the file 500 (e.g., a plurality of blocks) is saved as metadata in the main block 510. Thus, the main block 510 contains the metadata for the group of these sizes with an indication of the current file regions.

As described above with respect to Steps 415-425 of FIG. 4, a sparsing operation can be performed to remove unused regions of file 500. According to the exemplary aspect, the data management module 114, and, more particularly, the file managing and removing module 230 is configured to analyze the data file 500 to identify information relating to an occupied physical region of the data file 500 where the region contains unused data. For exemplary purposes, the occupied physical region shown in FIG. 5A is annotated as region 530. In the particular example of FIG. 5A, occupied region (or space) 530 overlaps block #2 (i.e., block 520b), block #3 (i.e., block 520c), and portions of block #1 (i.e., block 520a) and block #4 (i.e., block 520d).

According to the exemplary aspect, the file managing and removing module 230 analyzes the file 300 to determine certain a storage volume(s) (e.g., region 530) that is occupied by unused or removed file regions. According to certain aspects, this information can be contained in the file metadata or defined by file data mapping to storage as described above. In other aspects, files systems like NTFS and Ext* can use alternative approaches, as it depends on the development strategy, for example, the data could be a separate mapping of logical data to "physical" data structures. The information obtained relating to the occupied space can be obtained in the form of a structure and can be both for the file 500 as a whole and/or for a portion of the file 500 to reduce the size of the resulting structure. Thus, if the file 500 is very large (e.g., has many secondary blocks), the file managing and removing module 230 can perform the sparsing operation for a portion of the file 500.

According to one aspect, the structure obtained related to the occupied region can be a block size that indicates a multiple of a minimum size of a region that can be removed. In addition, the information can be a fragment size that is a multiple of the block size. Further, the information can include data relating to an offset in the file 500, that is, information starting with which is related to the occupied location (e.g., region 530). According to a further aspect, the information can include data relating to an array with information on the space occupied per fragment. For example, this information can include the size of the occupied space (e.g., region 530) in the fragment or the percentage of occupied space. Alternatively or in addition, the information can include the size of free space in the fragment or a percentage of the free space.

As further shown in FIG. 5A, the file managing and removing module 230 is configured to determine a position of a first boundary 540a of the occupied space 530, which, as shown, extends through block #1 (i.e., block 520a). It should be appreciate that block 520a includes both real data that is currently used by the data file 500, which is data in block 520a to the left of the first boundary 540a of the occupied space or region 530, and unused space that is to the right of the first boundary 540a in the occupied space or region 530. The first boundary 540a is determined as the start of the unused region 530.

Furthermore, the file managing and removing module 230 is configured to determine a position of a second boundary 540b of the occupied space 530, which, as shown, extends through block #4 (i.e., block 520d). It should be appreciate that block 520d includes both real data that is currently used by the data file 500, which is data in block 520d to the right of the second boundary 540b of the occupied space or region 530, and unused space that is to the left of the second boundary 540b of the occupied space or region 530. The second boundary 540b is determined as the end of the unused region 530.

In addition, the file managing and removing module 230 is configured to equalize the determined occupied region 530 to ensure that the sparsing operation does not remove current or real data used by file 500. In particular, the start of the occupied region 530 is equalized in the larger direction (i.e., in the direction to the right) and the end of the occupied region is equalized in the smaller direction (i.e., in the direction to the left).

FIG. 5B illustrates an equalizing step of the sparsing operation according to an exemplary aspect. As shown, the file managing and removing module 230 is configured to equalize the occupied region 530 by shifting the first boundary 540a to align with the start of the next block in the sequence of plurality of blocks in the file 500. That is, the first boundary 540a is positioned to start 540a' at the beginning of block #2 (i.e., block 520b). Similarly, the file managing and removing module 230 is configured to equalize the occupied region 530 by shifting the second boundary 540b to align with the end of the previous block in the sequence of plurality of blocks in the file 500. That is, the second boundary 540b is positioned at the end of block #4 (i.e., block 520d) as shown at 540b'. As a result, the file managing and removing module 230 defines a removal region 550 that can be removed from the file 500. In the instance where the first boundary 540a is already aligned with the start of a block in the sequence of blocks (not shown), the start of the removal region 550 is defined as the first boundary 540a without equalizing this boundary. Likewise, in the instance where the second boundary 540b is already aligned with the end of another block in the sequence of blocks (not shown), the send of the removal region 550 is defined as the second boundary 540b without equalizing this boundary. In any case, the equalizing operation advantageously allowed the physical size of file 500 to be reduced, but also ensuring that no real data in either block 520a or block 520d is removed.

According to one aspect, the file managing and removing module 230 only removes the removal region 550 under certain circumstances. In particular, the file managing and removing module 230 first determines or estimates the amount or size of actual reduction of the removal region 500, taking into account the obtained information on the current allocation of space and the region or group of regions set for removal (i.e., the removal region). According to an exemplary aspect, if the decrease in the size of space occupied by the fragment exceeds a given amount such as a predetermined threshold of space (e.g., 10% of the overall size of file 500 or 1 Mb) or the removal covers the fragment (or remainder of the fragment), the file managing and removing module 230 removes the removal region 550.

According to an additional aspect, there are certain instances when the storage (e.g., remote data storage 130) does not support obtaining information on the current occupied space, but information relating to previous sparsing operations of the file 500 is available from other sources, such as from an algorithm for calculating regions being removed, previously stored information or the like. In this instance, rather than obtaining the actual information about the occupied space as described above, the file managing and removing module 230 postulates the dimensions of the block and fragment starting from common considerations. For example, the file managing and removing module 230 selects a block size that is a multiple of the actual or typical size of a cluster on the hard disk of the storage (e.g., remote data storage 130) and a fragment size is selected based on the size of the file 300 so as to obtain a small number of fragments or even one fragment.

According to yet a further aspect, the storage (e.g., remote data storage 130) may not support the obtaining of information on the current occupied space and information relating to previous sparse operations of the file 500 is also unavailable. In this instance, the file managing and removing module 230 postulates the dimensions of the block size and the fragment, starting from common considerations. For example, the file managing and removing module 230 selects a block size that is a multiple of the actual or typical size of a cluster on the hard disk and selects a fragment size based o the full size of the file 500, such that a small number of fragments or even a single fragment is used.

Figure 6A:
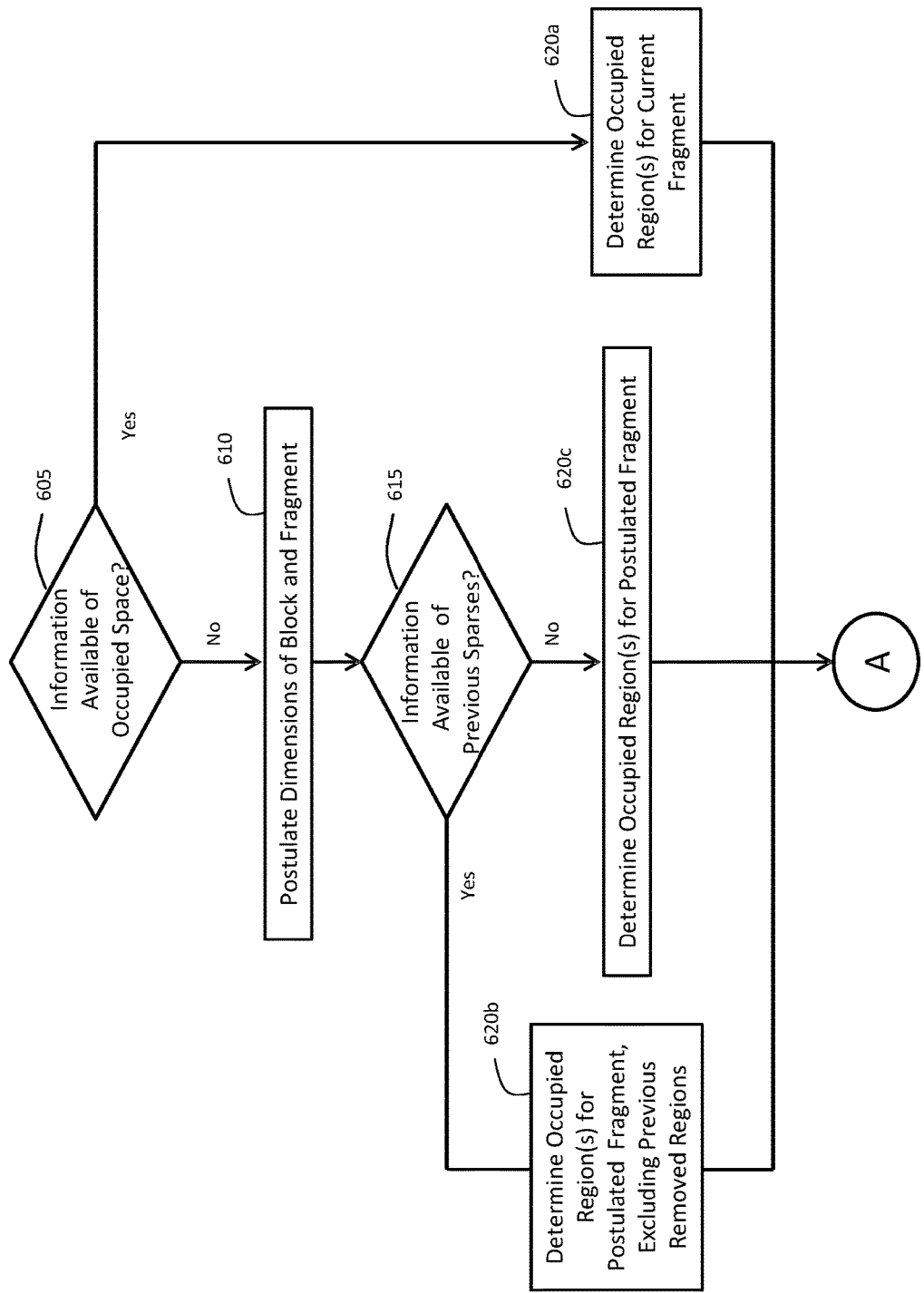
FIGS. 6A and 6B illustrate a flowchart of performing a sparsing operation according to an exemplary aspect.
Figure 6B:
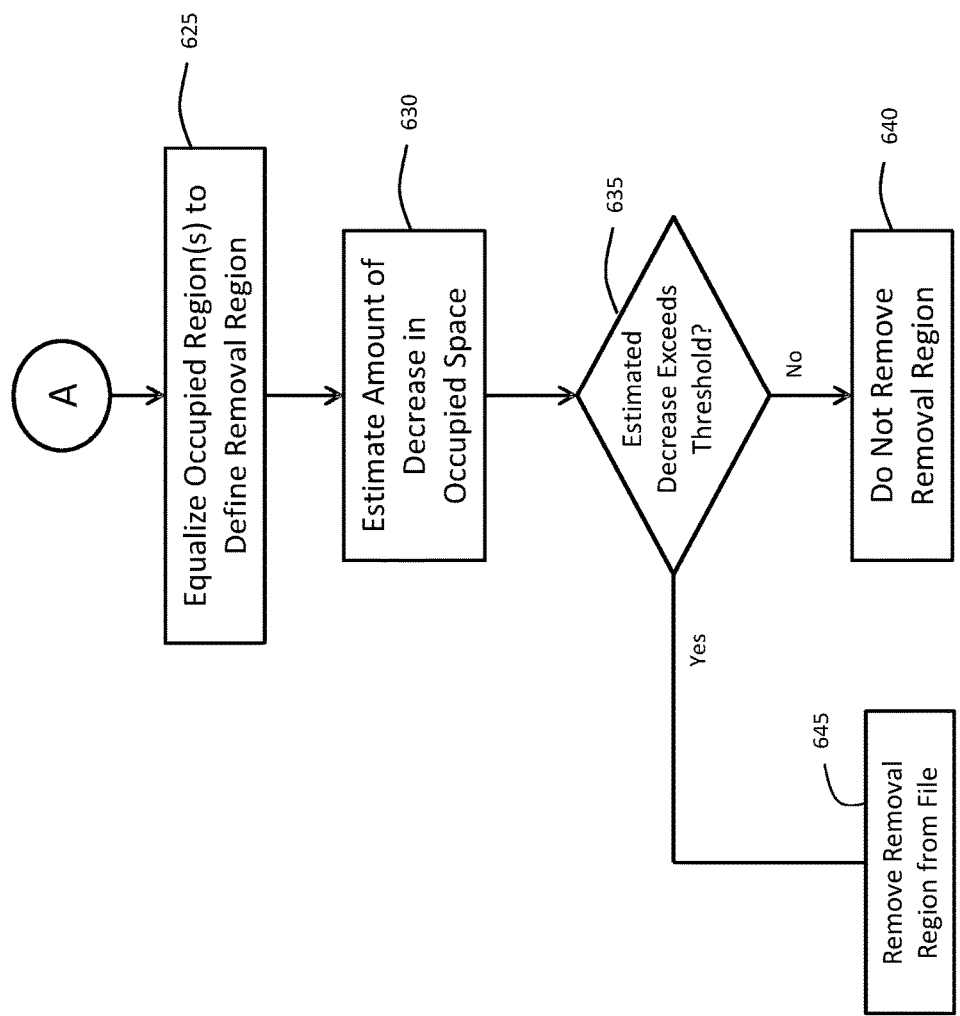

FIGS. 6A and 6B illustrate a flowchart of performing a sparsing operation according to an exemplary aspect. As shown, initially at Step 605, the file managing and removing module 230 determines whether information of occupied space in the file (e.g., file 500 shown in FIG. 5A) is available. If information is available, as discussed above, the method proceeds to Step 620a, which will be discussed in more detail below. If information is not available regarding occupied space of the current file 500, the method proceeds to Step 610 where the file managing and removing module 230 postulates the dimensions of the block and fragment as discussed above. Once this information is determined, the method proceeds to Step 615 to determine whether information is available regarding previous sparsing operations of the file 500. This information can be obtained from an algorithm for calculating regions being removed, from previously stored information or the like. If this information regarding previous sparsing operations is not available, the method proceeds to Step 620c to determine one or more occupied regions for the postulated regions 620c. Alternatively, if information of previous sparsing operations is available, the method proceeds to Step 620b to determine one or more occupied regions for the postulated fragment, but excludes previously removed regions based on the prior information. Finally, as noted above, if the file managing and removing module 230 is able to determined information of occupied space in the file 500, the method proceeds to Step 620a to determine one or more occupied regions for the current fragment. In any of the cases performed by Steps 620a, 620b or 620c, the occupied regions, for example, can be considered as a region such as region 530 illustrated in FIG. 5A.

Once the occupied region is determined at any of Steps 620a, 620b or 620c, the method as shown in FIG. 6A proceeds to Step "A", which is then continued in FIG. 6B. In particular, at Step 625, the file managing and removing module 230 performs the equalizing step of the occupied region 530. For example, as shown in FIG. 5B, this is done by shifting the first boundary 540a to align with the start of the next block in the sequence of plurality of blocks in the file 500 (i.e., position 540a') and by shifting the second boundary 540b to align with the end of the previous block in the sequence of plurality of blocks in the file 500 (i.e., position 540*b*'). Next, the method proceeds to Step 630 to estimate the amount of decrease in occupied space. This estimate amount of decreased space is then compared with a threshold, such as a predetermined threshold, at Step 635. As noted above, the threshold can be, for example, a percentage such as 10% of the overall size of file 500 or a set amount of storage such as 1 Mb. If the amount of decrease space exceeds the predetermined threshold, the method proceeds to Step 645 where the removal region (e.g., removal region 550 of FIG. 5B) is removed by the file managing and removing module 230. Otherwise, if the amount of decrease space does not exceed the predetermined threshold, the method proceeds to Step 640 where the removal region is not removed. As noted above, the sparsing operation or algorithm shown in FIGS. 6A and 6B is able to reduce the physical size of file 500 without inadvertently removing any real data.

As further described above, a lock operation can be performed to support certain I/O requests 112. In particular, the data management module 114, and more particularly, the file locking module 240 shown in FIG. 2A, is configured to execute a lock operation of the file 300 to facilitate certain secondary operations of the file 300, such as removing the file, renaming the file, performing sparsing operations of the file, for example. According to the exemplary aspect, the lock operation can be used to provide exclusive access to the file 300 and not allow any other files to be obtained. Moreover, the lock operation is provided to protect against writing to the file 300 that allows the owner to write to a file, but in parallel also allows another user to obtain a plurality of read locks. According to one aspect, read locks make it possible to obtain only other read locks and a single write lock.

In general, online/remote file storage services, such as S3 and Azure discussed above, provide an option of a conditional refreshing of the metadata of the data files (e.g., the S3 objects and Azure blobs) by indicating an "If-Match" request in the header field of a write request to the data file. According to one exemplary aspect of the method and system described herein, the If-Match request in the header field can be used with the method to make it conditional. Thus, if the computer 110 has one or more entities previously obtained from the storage, the computer 110 can verify that one of those entities is current by including a list of the associated entity tags ("ETags") in the If-Match header field. For this purpose, in response to a reading/modification of a block of file 300, the server 320 can return the associated ETag that identifies the current state of the specific block to the computer 110. If a subsequent refreshing operation of the file 300 indicates that the "If-Match" request is equal to the previous ETag, and the computer 110 will determine that a parallel operation is already modifying the block of the file 300 and the request for the reading/modification of the file 300 will not be executed due to the conflict (e.g., HTTP error 409 conflict).

Figure 7:
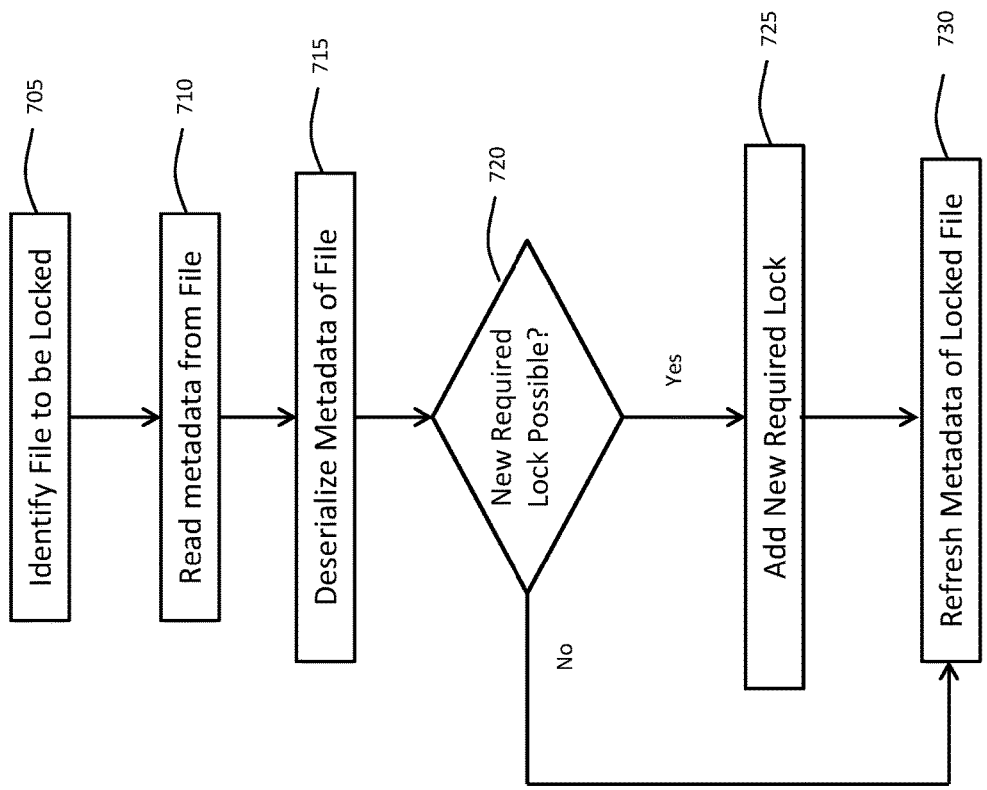
FIG. 7 illustrates a flowchart for an exemplary method of performing a locking operation of a file according to an exemplary aspect.

In view of the foregoing, FIG. 7 illustrates a flowchart for an exemplary method of performing a block operation of a file according to an exemplary aspect. Initially, at Step 705, an existing file (e.g., file 300) stored in the remote data storage 130 is identified to be locked. According to one aspect, this step can be performed as an I/O request 112 by the API of the client computer 110, and more particularly, executed by the data management module 114. Next, at Step 710, the metadata is read from the main block 310 of the identified file 300. Once accessed, the metadata from the main block 310 is then deserialized with the lock identifiers at Step 715. Deserialization is the process translating the metadata from the state as stored in the main block 310 into a format of data structures or objects. According to one aspect, each lock record can contain a lock ID (e.g., a GUID), a lock level or type (e.g., a read, append, exclusive, or the like), and a lock renewing/creation timestamp. Lock operation metadata structures contain a list of read lock records, an append lock record or null and exclusive lock record or null. According to this aspect, all of this metadata structure is serialized as a byte array (e.g., BLOB) and stored as part of file metadata. Deserialization parses that BLOB and fills the structure.

As further shown in FIG. 7, once the metadata is then deserialized, the method determines at Step 720 whether it is possible to add a new required lock to the metadata. If it is not possible, the method proceeds to Step 730 as will be discussed below. However, if it is possible, the method proceeds to Step 725 where the new required lock is added to the metadata. In general, the lock policy (or rules) is establish that an exclusive lock is not compliant with any other locks, an append lock can be set as only one per file (if there is no exclusive lock) and is compliant with one or more read locks, and any amount of read locks can be allowed if there is no exclusive lock. Thus, according to Step 725, if a requested or required lock is allowed, it can be added to the lock metadata structure (or renewed by adjusting of timestamp). Once the lock metadata structure is added to the metadata, the metadata is refreshed for the main block 310 at Step 725 (i.e., it is added back to the main block), indicating the new serialized value of the line with the locks. It should be appreciated that at this point, any time a client computer attempts to access the "locked" file 300 for performing a function, such as reading and writing data to the file, the metadata will of the file 300 stored in the main block 310 will indicate to the requesting client computer that the target file is locked for the particular request. Thus, the client computer will be effectively prevented from performing the requested action as would be understood to one skilled in the art.

According to an exemplary aspect of the method and system disclosed herein, the line with locks will contain unique identifiers of the locks, which identifies information including, but not limited to the time of lock expiration, the lock type (e.g., exclusive, read or write) and the like. According to one aspect, if a file lock expires, then, when another client computer attempts to establish a new lock it is ignored and removed from the line. Thus, after establishing a lock according to the algorithm described above with respect to FIG. 7, the client computer 110 should periodically refresh the lock identifiers, including the lock expiration. For this operation, the file API begins a separate thread that performs the refreshing of lock identifiers at a given frequency (having/knowing the proper ID of the lock).

According to another exemplary aspect, in the event of a parallel successful lock operation requests on the part of several client computers (for example, one write request and several read requests), it is possible that collisions will arise upon refreshing the metadata in the main block 310 of the file 300 due to noncompliance of the ETag indicated in the If-Match request. In this case, one or more of the client computers will be forced to do a repeat reading of a new version of the metadata with a refreshed ETag. Preferably, the client computer's requested locking operation will not be removed from the list of requests, since the client computer will successfully refresh the time (unless too much time has passed). Furthermore, the expiration interval should be chosen in the order of minutes (perhaps dozens of minutes)

so that the refresh time is not be very small, and the server 120 will not be overburdened with a large number of such requests. In general, it should be appreciated that parameters, such as the lock operation expiration time and the refresh rate, are specified according to the client's settings and transmitted to the storage service provider by the data management module 114.

According to one refinement of the exemplary aspect, a separate scenario arises when the client computer 110, for example, reads an object from an S3 storage service provider or a blob from an Azure storage service provide by placing the object or blob in the storage and bypassing the file API. In this case, if the client computer 110 determines that the main block 310 of the file 300 does not contain the required metadata specifying the location of the secondary blocks, the main block 310 is interpreted as a legacy file and can be read at will. If such a file requires an append, then the additional data can be appended to the file 300 using the algorithm illustrated in FIG. 4 and described above if the size of the additional data is less than the block size. Otherwise, the append goes to a block whose offset is equal to the initial file size, and whose size is such that the upper boundary is aligned with the defined block boundary. The other secondary blocks follow the general rule described above. Moreover, the main block 310 will contain all necessary metadata, including the block size. In this instance, the block coming after the main block 310 (e.g., block 320*a*) is addressed during reading by an offset that is defined as max (block-size, main-block-size).

Figure 8:
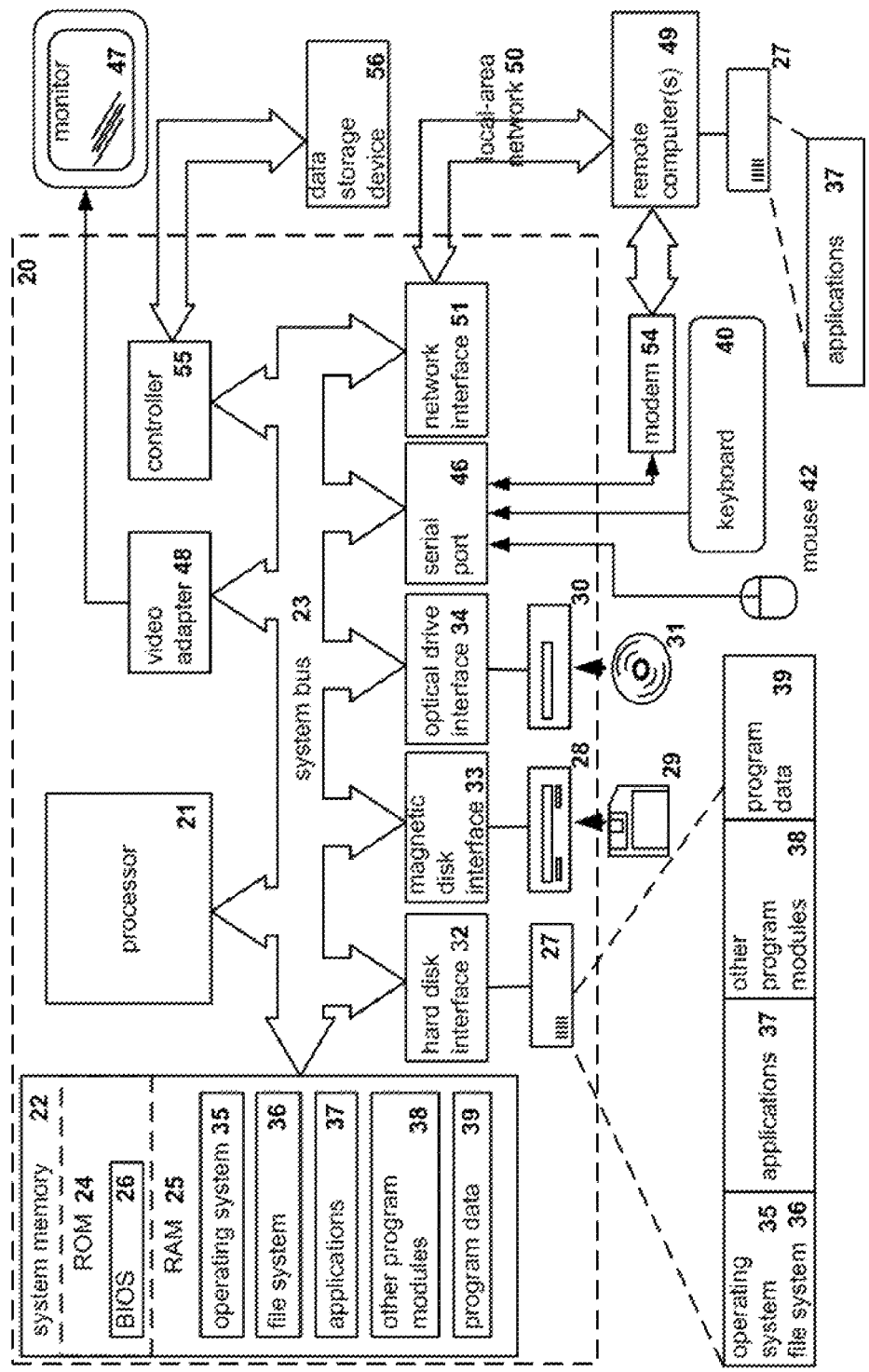
FIG. 8 illustrates an example of a general-purpose computer system on which the disclosed systems and method can be implemented.

Finally, FIG. 8 illustrates an example of a general-purpose computer system (which may be a personal computer or a server) on which the disclosed systems and method can be implemented according to an example aspect. It should be appreciated that the detailed general-purpose computer system can correspond to the computer 110 described above with respect to FIG. 1. Moreover, the remote computer(s) 49, as described below, can correspond to the remote data storage services discussed above with respect to the exemplary system and method.

As shown in FIG. 8, the computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20, as shown in FIG. 3. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for reducing a physical size of a data file that includes a plurality of blocks in sequence with each block having a defined size with a starting position and an end position, the method comprising:
    postulating, by a processor, a size relating to at least one occupied physical region of the data file, if the processor cannot obtain information relating to the at least one occupied physical region of the data file, wherein the at least one occupied physical region contains at least one of unused space and unused data;
    determining, by the processor, positions of a first boundary and a second boundary of the at least one occupied physical region of the data file relative to the plurality of blocks in the data file;
    when the position of the first boundary of the at least one occupied physical region is within one of the plurality of blocks in the sequence, defining the starting position of a next block in the sequence relative to the one block as a start of a removal region;
    when the position of the second boundary of the at least one occupied physical region is within another of the plurality of blocks in the sequence, defining the ending position of a previous block in the sequence relative to the another block as an end of the removal region; and
    removing, by the processor, data between the start and end of the removal region to reduce the physical size of the data file.

2. The method of claim 1, further comprising defining the start of the removal region as the first boundary of the at least one occupied physical region if the first boundary is aligned with a starting position of one of the plurality of blocks in the sequence.

3. The method of claim 1, further comprising defining the end of the removal region as the second boundary of the at least one occupied physical region if the second boundary is aligned with an ending position of another of the plurality of blocks in the sequence.

4. The method of claim 1, further comprising:
    estimating, by the processor, a physical size of the removal region between the start and end of the removal region;
    comparing, by the processor, the physical size of the removal region with a predetermined threshold; and
    removing, by the processor, the data between the start and end of the removal region to reduce the physical size of the data file only if the physical size of the removal region exceeds the predetermined threshold.

5. The method of claim 4, wherein the predetermined threshold is at least one of a percentage of an overall size of the data file and a defined amount of data.

6. The method of claim 1, further comprising:
    obtaining, by the processor, information relating to previous sparsing operations of the data file; and
    determining, by the processor, the positions of the first boundary and the second boundary of the at least one occupied physical region of the data file that exclude regions previously removed by the previous sparsing operations.

7. A system for reducing a physical size of a data file that includes a plurality of blocks in sequence with each block having a defined size with a starting position and an end position, the system comprising:
    an electronic memory configured to store the data file; and
    a processor configured to:
        postulate a size relating to at least one occupied physical region of the data file in the electronic memory, if the processor cannot obtain the information relating to the at least one occupied physical region of the data file in the electronic memory, wherein the at least one occupied physical region contains at least one of unused space and unused data,
        determine positions of a first boundary and a second boundary of the at least one occupied physical region of the data file relative to the plurality of blocks in the data file;
        when the position of the first boundary of the at least one occupied physical region is within one of the plurality of blocks in the sequence, define the starting position of a next block in the sequence relative to the one block as a start of a removal region,
        when the position of the second boundary of the at least one occupied physical region is within another of the plurality of blocks in the sequence, define the ending position of a previous block in the sequence relative to the another block as an end of the removal region; and
        remove data between the start and end of the removal region to reduce the physical size of the data file in the electronic memory.

8. The system of claim 7, wherein the processor is further configured to define the start of the removal region as the first boundary of the at least one occupied physical region if the first boundary is aligned with a starting position of one of the plurality of blocks in the sequence.

9. The system of claim 7, wherein the processor is further configured to define the end of the removal region as the second boundary of the at least one occupied physical region if the second boundary is aligned with an ending position of another of the plurality of blocks in the sequence.

10. The system of claim 7, wherein the processor is further configured to:
    estimate a physical size of the removal region between the start and end of the removal region;
    compare the physical size of the removal region with a predetermined threshold; and remove the data between the start and end of the removal region to reduce the physical size of the data file only if the physical size of the removal region exceeds the predetermined threshold.

11. The system of claim 10, wherein the predetermined threshold is at least one of a percentage of an overall size of the data file and a defined amount of data.

12. The system of claim 7, wherein the processor is further configured to:
   obtain information relating to previous sparsing operations of the data file; and
   determine the positions of the first boundary and the second boundary of the at least one occupied physical region of the data file that exclude regions previously removed by the previous sparsing operations.

13. A non-transitory computer readable medium storing computer executable instructions for reducing a physical size of a data file that includes a plurality of blocks in sequence with each block having a defined size with a starting position and an end position, including instructions for:
   postulatng, by a processor, a size relating to at least one occupied physical region of the data file if the processor cannot obtain information relating to the at least one occupied physical region of the data file, wherein the at least one occupied physical region contains at least one of unused space and unused data;
   determining positions of a first boundary and a second boundary of the at least one occupied physical region of the data file relative to the plurality of blocks in the data file;
   when the position of the first boundary of the at least one occupied physical region is within one of the plurality of blocks in the sequence, defining the starting position of a next block in the sequence relative to the one block as a start of a removal region;
   when the position of the second boundary of the at least one occupied physical region is within another of the plurality of blocks in the sequence, defining the ending position of a previous block in the sequence relative to the another block as an end of the removal region; and
   removing data between the start and end of the removal region to reduce the physical size of the data file.

14. The non-transitory computer readable medium of claim 13, further including instructions for defining the start of the removal region as the first boundary of the at least one occupied physical region if the first boundary is aligned with a starting position of one of the plurality of blocks in the sequence.

15. The non-transitory computer readable medium of claim 13, further including instructions for defining the end of the removal region as the second boundary of the at least one occupied physical region if the second boundary is aligned with an ending position of another of the plurality of blocks in the sequence.

16. The non-transitory computer readable medium of claim 13, further including instructions for:
   estimating a physical size of the removal region between the start and end of the removal region;
   comparing the physical size of the removal region with a predetermined threshold; and
   removing the data between the start and end of the removal region to reduce the physical size of the data file only if the physical size of the removal region exceeds the predetermined threshold.

17. The non-transitory computer readable medium of claim 13, further including instructions for:
   obtaining information relating to previous sparsing operations of the data file; and
   determining the positions of the first boundary and the second boundary of the at least one occupied physical region of the data file that exclude regions previously removed by the previous sparsing operations.

* * * * *